April 14, 1942.　　　　　E. L. OLIVER　　　　　2,279,838
FILTER
Filed July 2, 1940
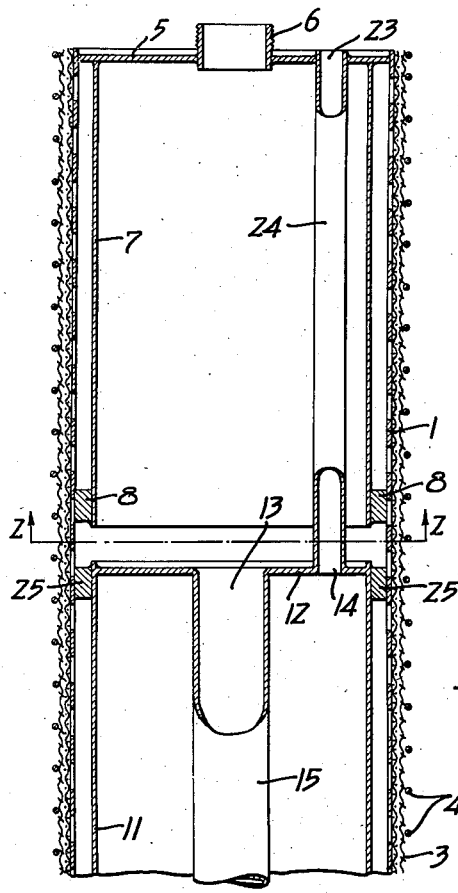
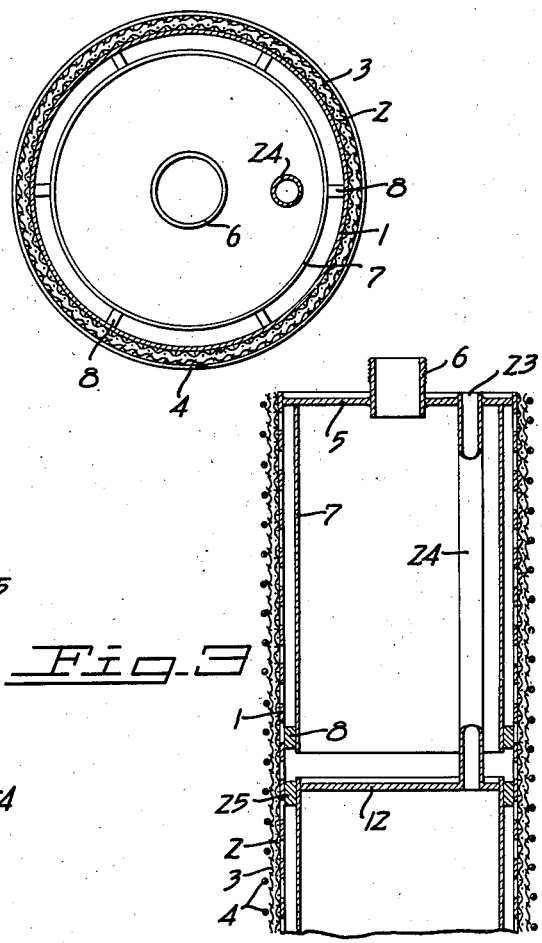
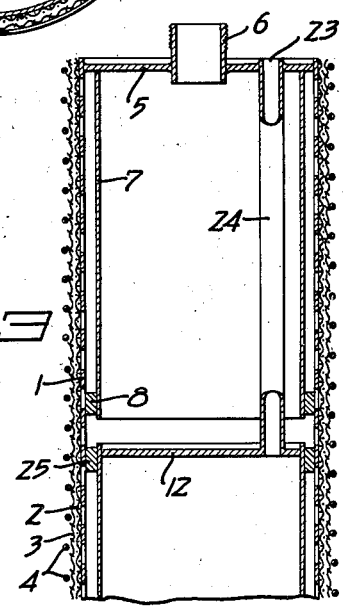
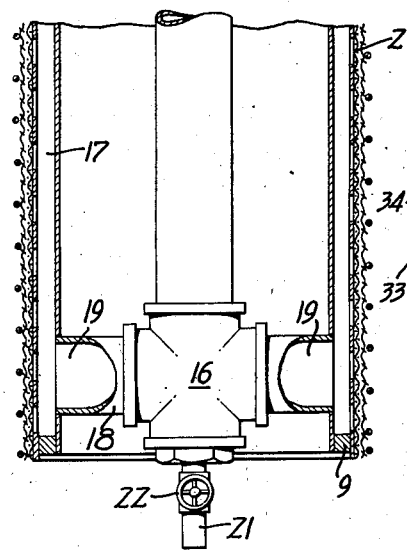
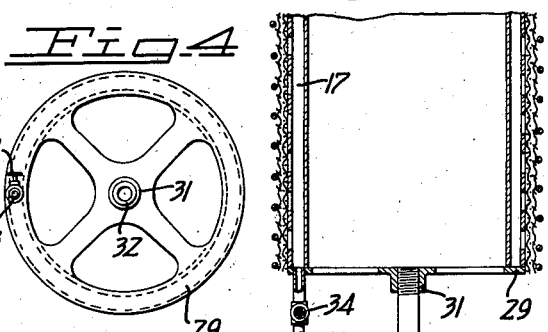
INVENTOR
EDWIN LETTS OLIVER
BY
ATTORNEY Patented Apr. 14, 1942

2,279,838

UNITED STATES PATENT OFFICE 2,279,838

FILTER

Edwin Letts Oliver, Piedmont, Calif., assignor to Oliver United Filters Incorporated, Oakland, Calif., a corporation of Nevada Application July 2, 1940, Serial No. 343,571

5 Claims. (Cl. 210—154)

This invention relates in general to filters and more particularly to filters of the tube thickener type.

Tube thickeners in general consist of a tank for the accommodation of the material to be filtered. Depending into this tank are one or more perforate tubes having their lower ends closed and provided on their peripheries with a suitable filter medium. The upper ends of these tubes communicate through suitable conduits with an automatic valve by means of which the interior of the tube may be successively subjected to subatmospheric pressure and to superatmospheric pressure. Upon the application of subatmospheric pressure to the interior of the tube, liquid from the material being filtered passes through the filter medium to the interior of the tube and then outwardly through the automatic valve. At the same time a cake of solids tends to build up on the surface of the filter medium. Upon the application of a reverse pressure the cake deposited on the filter medium is blown outwardly therefrom, the cycle of operation then being repeated. Ordinarily air is used as the working medium for effecting a reverse pressure for discharging the tubes.

Two problems arise in connection with a tube of this character. In the first place, to effect a uniform discharge of the cake formed on the filter medium it is essential that the air used as a working medium for effecting the reverse pressure be kept from gaining access to the walls of the tube, for if this should occur the air would simply pass out through that portion of the tube, leaving the remaining portion of the tube undischarged. In the second place, it is oftentimes desirable to remove one of the tubes for repairs while the thickener is in operation. In reconnecting such a tube after the repairs have been made, it must be submerged in the material contained in the thickener tank, and since the tube is filled with air it is relatively buoyant and consequently considerable difficulty is experienced in maintaining the tube submerged with its upper end in strict alignment with its connection to the automatic valve.

One of the objects of this invention is the provision of a thickener tube having a relatively small internal capacity, so that the amount of air entrapped therein is correspondingly small, and so constructed that its entire filtering surface may be discharged without the escape of air through any portion thereof.

The invention possesses other advantageous features, some of which with the foregoing will be set forth at length in the following description where those forms of the invention which have been selected for illustration in the drawing accompanying and forming a part of the present specification are outlined in full. In said drawing, two forms of the invention are shown, but it is to be understood that it is not limited to such forms, since the invention as set forth in the claims may be embodied in a plurality of forms.

Referring to the drawing:

Figure 1 is a vertical mid-section taken through a tube embodying the objects of my invention.

Figure 2 is a section taken on the line 2—2 of Figure 1.

Figure 3 is a vertical mid-section taken through a modification of the tube shown in Figure 1.

Figure 4 is a bottom plan view of Figure 3.

As shown in Figures 1 and 2, the objects of my invention have been embodied in a thickener tube comprising a sheet metal perforate shell 1 which preferably is slightly tapered from its upper to its lower ends. Disposed over the outer surface of the shell 1 is a layer 2 of wire mesh screen, and over that a layer 3 of filter medium. The filter medium is held in place against the screen by means of spiral wire winding 4 which also serves to form weakened lines in the cake deposited on the filter medium so that the cake may be more readily discharged.

Welded over the upper end of the shell 1 is a plate 5 to which is secured a threaded pipe fitting 6. By means of this pipe fitting the thickener tube may be connected with the automatic valve usually associated with thickeners of this type. Depending from the plate 5 and welded thereto is an inner imperforate tube 7 maintained at its lower end in spaced relation to the shell 5 by means of circumferentially spaced spacers 8. Welded to the lower end of the shell 1 is a ring 9, and sealed to the inner periphery of the ring 9 is an imperforate tube 11 extending upwardly within the shell 1 and terminating just short of the lower end of the tube 7.

Welded across the upper end of the tube 11 is a plate 12 formed with a central opening 13 and with an offset opening 14. Welded to the plate 12 in registration with the opening 13 is a pipe 15, the lower end of which terminates in a T 16. Communication between the T 16 and the filtrate chamber 17 defined by the shell 1 and the tube 11 is established by means of nipples 18 threaded at their inner ends to the T 16 and welded at their outer ends in registration with openings 19 formed in the tube 11. Depending from the lower end of the T 16 is a drain pipe 21 provided with a valve 22. This pipe may be used not only for the purpose of draining the thickener tube but also for the purpose of properly locating the tube when reconnecting it after repairs, as more fully set forth in the Hillier Patent 2,100,646 of November 30, 1937.

The plate 5 is formed with an offset opening 23, and welded to the plates 5 and 12 in registration with the opening 23 and the opening 14 formed in the plate 12 is an air vent pipe 24.

For the purpose of holding the upper end of the tube 11 properly spaced from the shell 1, circumferentially spaced spacers 25 are welded between these two members.

From the above description it will be noted that the shell 1 forms with the tubes 7 and 11 a pair of relatively narrow annular filtrate compartments. The tube 7 defines a filtrate compartment in communication with these annular filtrate compartments and also in communication with the pipe 15.

When in operation, a tube of this character is surrounded by the pulp or slurry to be thickened, the pulp or slurry also being free to pass upwardly through the lower end of the tube in contact with the inner walls of the tube 11. When vacuum is applied to the tube through the fitting 6, the liquid content of the pulp passes through the shell 1 into the annular filtrate compartments defined by the shell and the tubes 7 and 11. From the lower end of the annular filtrate compartment 17, the filtrate flows through the T 16 and the pipe 15 into the interior of the tube 7, whereas the filtrate passing into the upper end of the filtrate compartment 17 passes upwardly into the tube 7. The filtrate passing into the annular filtrate compartment defined by the shell 1 and the tube 7 passes downwardly around the lower edge of the tube 7 and into the tube 7. All of the filtrate finding its way into the tube 7 passes out through the fitting 6 to the automatic valve associated with the thickener. During this pick-up period of the cycle of operation, a layer of solids is formed on the filter medium. Upon the application of a reverse pressure by means of a working medium of air, air is forced under pressure through the automatic valve and the conduit communicating with the pipe fitting 6, and in so doing forces the filtrate contained in this pipe downwardly into the tube 7. This in turn forces the filtrate contained in the tube 7 outwardly through the gap between the tube 7 and the tube 11 into the annular filtrate compartments and outwardly through the shell to discharge the layer of solids carried thereon. Some of the filtrate also finds its way downwardly into the pipe 15 and the T 16 into the lower end of the filtrate compartment 17 and from there outwardly through the shell 1. In this manner a uniform reverse pressure is applied to every portion of the cake and if the length of the tube 7 be properly chosen, the thickener tube should be completely discharged before any air reaches the lower end of the tube 7. This condition should of course be adhered to, for if air is permitted to pass through the lower end of the tube 7 it will immediately pass through the shell 1 and under such conditions there would be little or no application of reverse pressure to the remaining portions of the shell 1.

While the thickener tube as above described has been provided with a pipe 15 establishing communication between the lower end of the filtrate compartment 17 and the lower end of the tube 7, this construction is not necessary. For this reason I have shown in Figures 3 and 4 a modified form of tube in which the pipe 15 shown in Figures 1 and 2 has been omitted. Since in most respects the construction of this tube is identical with the construction of the tube shown in Figures 1 and 2, the same reference numerals have been applied thereto. However instead of closing the lower end of the filtrate compartment 17 with a ring 9, this has been done by means of a spider 29 formed with an internally threaded hub 31 into which is threaded a short section of pipe 32. The pipe 32 simply serves as a means for directing the tube into a suitable socket or guide member supported from the thickener tank as shown in the Hillier patent above referred to. The spider 29 may be welded to the lower ends of the shell 1 and the tube 11 and is provided with a depending drain pipe 33 carrying a valve 34.

In this modification the opening 13 formed in the plate 12 as shown in Figures 1 and 2 is of course omitted. During the pick-up period the filtrate passing through the shell 1 finds its way through the filtrate compartment 17 and the filtrate compartment defined by the shell 1 and the tube 7 into the interior of the tube 7 and hence outwardly through the fitting 6 to the conduit establishing communication between the tube thickener and the automatic valve. During the discharge period the filtrate contained within the tube 7 is displaced by air passing through the automatic valve and, being displaced, this filtrate passes into the annular filtrate compartments surrounding the tube 7 and 11 and outwardy through the shell 1 to discharge the cake formed thereon.

From the above description it is to be noted that the main objects of my invention have been accomplished in both modifications shown. In each case the tube may be discharged by a working medium of air without permitting the air to pass through the outer shell, and in each case the tube is so constructed that the air confined within the tube 11 may be vented through the air vent pipe 24 so that the tube may be readily immersed within the pulp contained in the thickener tank and maintained in proper registration with the couples and pipes by which it is connected to the automatic valve.

I claim:

1. A thickener tube comprising: a perforate shell; a cover sealed over the upper end of said shell; a lower inner imperforate tube extending upwardly from and sealed to the lower end of said shell; a plate sealed over the upper end of said lower tube; an upper inner imperforate tube depending from and sealed to said cover, the lower end of said upper tube being open and spaced from the upper end of said lower tube; means for maintaining said lower and upper inner tubes in spaced relation with respect to said shell so as to define lower and upper annular filtrate compartments; and means for establishing communication between the upper inner end of said lower tube and a point external to the upper end of said upper tube.

2. A thickener tube comprising: a perforate shell; a cover sealed over the upper end of said shell and provided with a port; a lower inner imperforate tube extending upwardly from and sealed to the lower end of said shell so as to define with said shell a lower annular filtrate compartment; a plate sealed over the upper end of said lower tube; an upper inner imperforate tube depending from and sealed to said cover so as to define with said shell an upper annular filtrate compartment; a conduit establishing communication between the upper end of the chamber circumscribed by said lower tube and a point above said cover; and a conduit extending through said lower tube and establishing communication between the space above said plate and the lower end of said lower annular filtrate compartment, the upper end of said lower tube being spaced from the lower end of said upper tube.

3. A thickener tube comprising: a perforate shell; a cover sealed over the upper end of said shell and provided with a port; a lower inner imperforate tube extending upwardly from and sealed to the lower end of said shell so as to define with said shell a lower annular filtrate compartment; a plate sealed over the upper end of said lower tube; an upper inner imperforate tube depending from and sealed to said cover so as to define with said shell an upper annular filtrate compartment; a conduit establishing communication between the upper end of the chamber circumscribed by said lower tube and a point above said cover; and a drain formed in the lower end of said lower annular filtrate compartment, the upper end of said lower tube being spaced from the lower end of said upper tube.

4. A thickener tube comprising: a perforate shell; a cover sealed over the upper end of said shell and provided with a port; a lower inner imperforate tube extending upwardly from and sealed to the lower end of said shell so as to define with said shell a lower annular filtrate compartment; a plate sealed over the upper end of said lower tube; an upper inner imperforate tube depending from and sealed to said cover so as to define with said shell an upper annular filtrate compartment; a conduit establishing communication between the upper end of the chamber circumscribed by said lower tube and a point above said cover; a conduit extending through said lower tube and establishing communication between the space above said plate and the lower end of said lower annular filtrate compartment; and a drain formed in the lower end of said lower annular filtrate compartment, the upper end of said lower tube being spaced from the lower end of said upper tube.

5. A thickener tube comprising: a perforate shell; a cover sealed over the upper end of said shell and provided with a port; a lower inner imperforate tube extending upwardly from and sealed to the lower end of said shell so as to define with said shell a lower annular filtrate compartment; a plate sealed over the upper end of said lower tube; an upper inner imperforate tube depending from and sealed to said cover so as to define with said shell an upper annular filtrate compartment; a conduit extending between said cover and said plate in registration with openings formed in said cover and plate so as to establish communication between the interior of the lower tube and the outer face of said cover; a conduit disposed within the chamber circumscribed by said lower tube communicating at its upper end through an opening formed in said plate and communicating at its lower end with the lower end of said lower annular filtrate compartment, the upper end of said lower tube being spaced from the lower end of said upper tube; and a downwardly extending drain communicating with the lower end of the conduit last referred to.

EDWIN LETTS OLIVER.